US012612175B2

(12) United States Patent
Darling

(10) Patent No.: US 12,612,175 B2
(45) Date of Patent: Apr. 28, 2026

(54) ELECTROCHEMICAL INERT GAS AND POWER GENERATING SYSTEM AND METHOD

(71) Applicant: Hamilton Sundstrand Corporation, Charlotte, NC (US)

(72) Inventor: Robert Mason Darling, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 101 days.

(21) Appl. No.: 17/874,428

(22) Filed: Jul. 27, 2022

(65) Prior Publication Data

US 2022/0355947 A1 Nov. 10, 2022

Related U.S. Application Data

(62) Division of application No. 16/375,653, filed on Apr. 4, 2019, now Pat. No. 11,530,048.

(51) Int. Cl.
H01M 8/04 (2016.01)
B01D 53/32 (2006.01)
(Continued)

(52) U.S. Cl.
CPC ........... B64D 37/32 (2013.01); B01D 53/326 (2013.01); C25B 1/04 (2013.01); C25B 9/73 (2021.01);
(Continued)

(58) Field of Classification Search
CPC .......... H01M 8/04186; H01M 8/0656; H01M 8/0606; H01M 8/1011; H01M 8/1009;
(Continued)

(56) References Cited

U.S. PATENT DOCUMENTS 3,847,298 A 11/1974 Hamilton
7,954,753 B2 6/2011 Hoffjann et al.
(Continued)

FOREIGN PATENT DOCUMENTS

CN 101239659 10/2012
GB 2420219 A 5/2006
(Continued)

OTHER PUBLICATIONS

Machined-generated translation of JP 2004253337, Yasuhiko et al., "Power Supply Device of Fuel Cell Vehicle", Sep. 9, 2004.*
(Continued)

*Primary Examiner* — Raymond Alejandro
(74) *Attorney, Agent, or Firm* — CANTOR COLBURN LLP

(57) ABSTRACT

A system is disclosed for providing inerting gas to a protected space, and also providing electrical power. The system includes an electrochemical cell comprising a cathode and an anode separated by a separator comprising a proton transfer medium. Inerting gas is produced at the cathode. A fuel source comprising methanol or formaldehyde or ethanol and a water source are each in controllable operative fluid communication with the anode. A controller is configured to alternatively operate the system in a first mode of operation where water is directed to the anode fluid flow path inlet and electric power is directed from a power source to the electrochemical cell, and in a second mode of operation in which the fuel is directed from the fuel source to the anode fluid flow path inlet and electric power is directed from the electrochemical cell to the power sink.

8 Claims, 3 Drawing Sheets

(51) Int. Cl.

| | |
|---|---|
| *B64D 37/32* | (2006.01) |
| *C25B 1/04* | (2021.01) |
| *C25B 9/73* | (2021.01) |
| *H01M 8/04186* | (2016.01) |
| *H01M 8/0656* | (2016.01) |
| *H01M 8/1011* | (2016.01) |

(52) U.S. Cl.
CPC ..... *H01M 8/04186* (2013.01); *H01M 8/0656* (2013.01); *H01M 8/1011* (2013.01); *B01D 2257/104* (2013.01); *H01M 2250/20* (2013.01)

(58) Field of Classification Search
CPC ...... H01M 8/04201; H01M 8/22; H01M 8/18; H01M 8/184; H01M 2250/20; B64D 37/32; B01D 53/326; B01D 2257/104; C25B 9/73; C25B 1/04
See application file for complete search history.

(56) References Cited

U.S. PATENT DOCUMENTS

| | | | |
|---|---|---|---|
| 8,567,516 B2 | 10/2013 | Bleil et al. | |
| 9,102,416 B1 | 8/2015 | Cutler | |
| 9,623,981 B2 | 4/2017 | Darling et al. | |
| 9,871,260 B2 | 1/2018 | Ribarov et al. | |
| 9,941,526 B2 | 4/2018 | Kawai | |
| 9,966,619 B2 | 5/2018 | Libis et al. | |
| 2012/0292058 A1 | 11/2012 | Bleil et al. | |
| 2014/0065510 A1 | 3/2014 | Mittelsteadt et al. | |
| 2015/0333347 A1 | 11/2015 | Brunaux et al. | |
| 2017/0125831 A1 | 5/2017 | Gasner et al. | |
| 2017/0131131 A1 | 5/2017 | Keech | |
| 2017/0331131 A1 | 11/2017 | Rheaume | |
| 2017/0341019 A1* | 11/2017 | Rheaume | B64D 37/32 |
| 2018/0319477 A1* | 11/2018 | Yakub | B64B 1/58 |
| 2020/0006525 A1 | 1/2020 | Crum et al. | |
| 2020/0317362 A1 | 10/2020 | Darling | |

FOREIGN PATENT DOCUMENTS

| | | | | |
|---|---|---|---|---|
| JP | 2004253337 | * | 9/2004 | H01M 8/00 |
| WO | WO 2008/124538 | * | 10/2008 | H01M 8/06 |

OTHER PUBLICATIONS

Extended European Search Report issued in Application No. 19211243.1 on Jun. 4, 2020, 7 pages.
EPO Official Letter for Application No. 19211243.1, mailed Apr. 7, 2025, 4 pages.

* cited by examiner

ELECTROCHEMICAL INERT GAS AND POWER GENERATING SYSTEM AND METHOD

CROSS-REFERENCE TO RELATED APPLICATIONS

This application is a division of U.S. application Ser. No. 16/375,653 filed Apr. 4, 2019, now Issued as U.S. Pat. No. 11,530,048, issued Dec. 20, 2022, which is incorporated herein by reference in its entirety.

BACKGROUND

The subject matter disclosed herein generally relates to systems for generating and providing inert gas, oxygen such as may be used on vehicles (e.g., aircraft, military vehicles, heavy machinery vehicles, sea craft, ships, submarines, etc.) or stationary applications such as fuel storage facilities, and also to provide emergency or non-emergency power.

It is recognized that fuel vapors within fuel tanks can become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage.

BRIEF DESCRIPTION

A system is disclosed for providing inerting gas to a protected space, and also providing electrical power. The system includes an electrochemical cell comprising a cathode and an anode separated by a separator comprising a proton transfer medium. A cathode fluid flow path is in operative fluid communication with the cathode between a cathode fluid flow path inlet and a cathode fluid flow path outlet. An anode fluid flow path is in operative fluid communication with the anode, including an anode fluid flow path outlet. An air source is in operative fluid communication with the cathode fluid flow path inlet. An inerting gas flow path is in operative fluid communication with the cathode fluid flow path outlet and the protected space. A water source is in controllable operative fluid communication with the anode fluid flow path inlet. A fuel source comprising methanol or formaldehyde or ethanol is in controllable operative fluid communication with the anode fluid flow path inlet. An electrical connection is in controllable communication between the electrochemical cell and a power sink, and between the electrochemical cell and a power source. A controller is configured to alternatively operate the system in alternate modes of operation. In a first mode of operation, water is directed to the anode fluid flow path inlet, electric power is directed from the power source to the electrochemical cell to provide a voltage difference between the anode and the cathode, and an inerting gas is directed from the cathode fluid flow path outlet to the protected space. In a second mode of operation, the fuel comprising methanol or formaldehyde or ethanol is directed from the fuel source to the anode fluid flow path inlet and electric power is directed from the electrochemical cell to the power sink.

In some aspects, the cathode fluid flow path outlet is in operative fluid communication with the protected space in the second mode of operation.

In any one or combination of the foregoing aspects, the fuel comprises methanol.

In any one or combination of the foregoing aspects, the fuel comprises formaldehyde.

In any one or combination of the foregoing aspects, the fuel comprises methanol and formaldehyde.

In any one or combination of the foregoing aspects, the fuel comprises ethanol.

In any one or combination of the foregoing aspects, the fuel source further comprises water, or wherein the anode fluid flow path inlet is operative fluid communication with the water source in the second mode of operation.

In any one or combination of the foregoing aspects, the system can further comprise a liquid-gas separator including an inlet in operative fluid communication with the anode fluid flow path outlet and a liquid outlet in operative fluid communication with the anode fluid flow path inlet.

In any one or combination of the foregoing aspects, the system is disposed on-board an aircraft, and the liquid-gas separator includes a gas outlet in operative fluid communication with a pressurized area of the aircraft or an occupant breathing system.

In any one or combination of the foregoing aspects, the system is disposed on-board an aircraft.

In any one or combination of the foregoing aspects, the controller is configured to operate the system in the first mode continuously or at intervals under normal aircraft operating conditions, and to operate the system in the second mode in response to a demand for emergency electrical power.

Also disclosed is a method of producing inert gas and generating electrical power with an electrochemical cell comprising an anode and a cathode separated by a separator comprising a proton transfer medium. According to the method, the electrochemical cell is operated in a first mode comprising electrolyzing water at the anode to form protons and oxygen, transporting the protons across the separator to the cathode, reacting the protons with oxygen at the cathode, and discharging an inerting gas depleted of oxygen from the cathode, and in a second mode comprising producing protons and electrons at the anode from a fuel comprising methanol or formaldehyde, transporting the protons across the separator to the cathode and transporting electrons to the cathode through an electrical circuit to produce electrical power.

In some aspects, the method further includes discharging an inerting gas depleted of oxygen from the cathode in the second mode of operation.

In any one or combination of the foregoing aspects, the fuel comprises methanol.

In any one or combination of the foregoing aspects, the fuel comprises formaldehyde.

In any one or combination of the foregoing aspects, the method can further include directing water to the anode in the second mode of operation.

In any one or combination of the foregoing aspects, the method can further include operating the system on-board an aircraft, and operating the system in the first mode continuously or at intervals under normal aircraft operating conditions, and operating the in the second mode in response to a demand for emergency electrical power.

In any one or combination of the foregoing aspects, the method can further include recycling liquid discharged from the anode back to the anode.

In any one or combination of the foregoing aspects, the method can further include operating the system on-board an aircraft and directing oxygen discharged from the anode to a pressurized area of the aircraft or to an occupant breathing system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
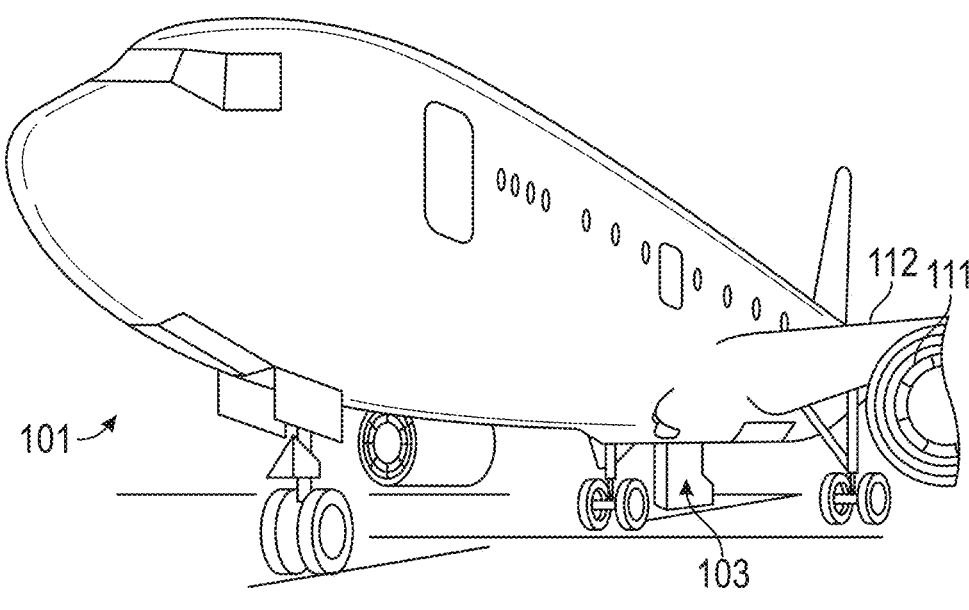
FIG. 1A is a schematic illustration of an aircraft that can incorporate various embodiments of the present disclosure.
Figure 1B:
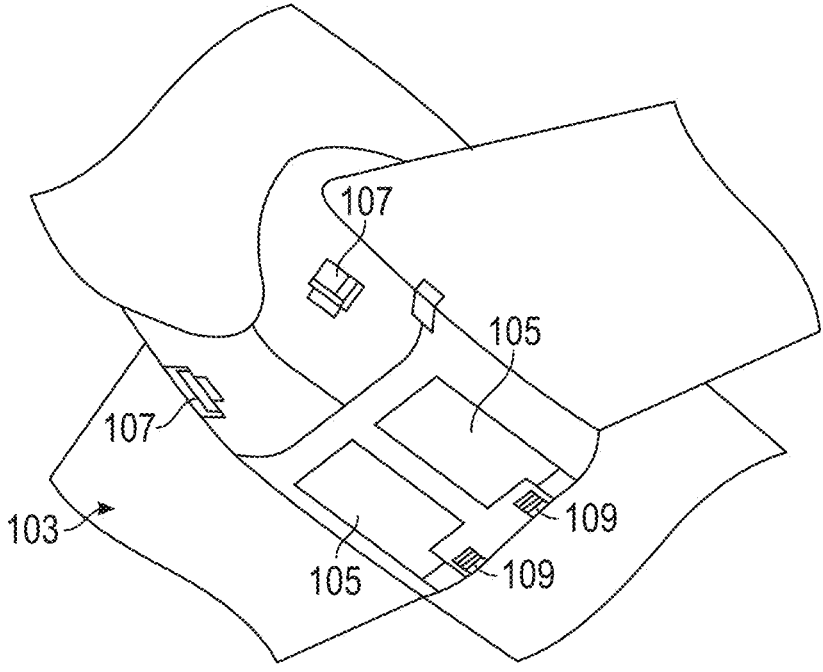
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inerting gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
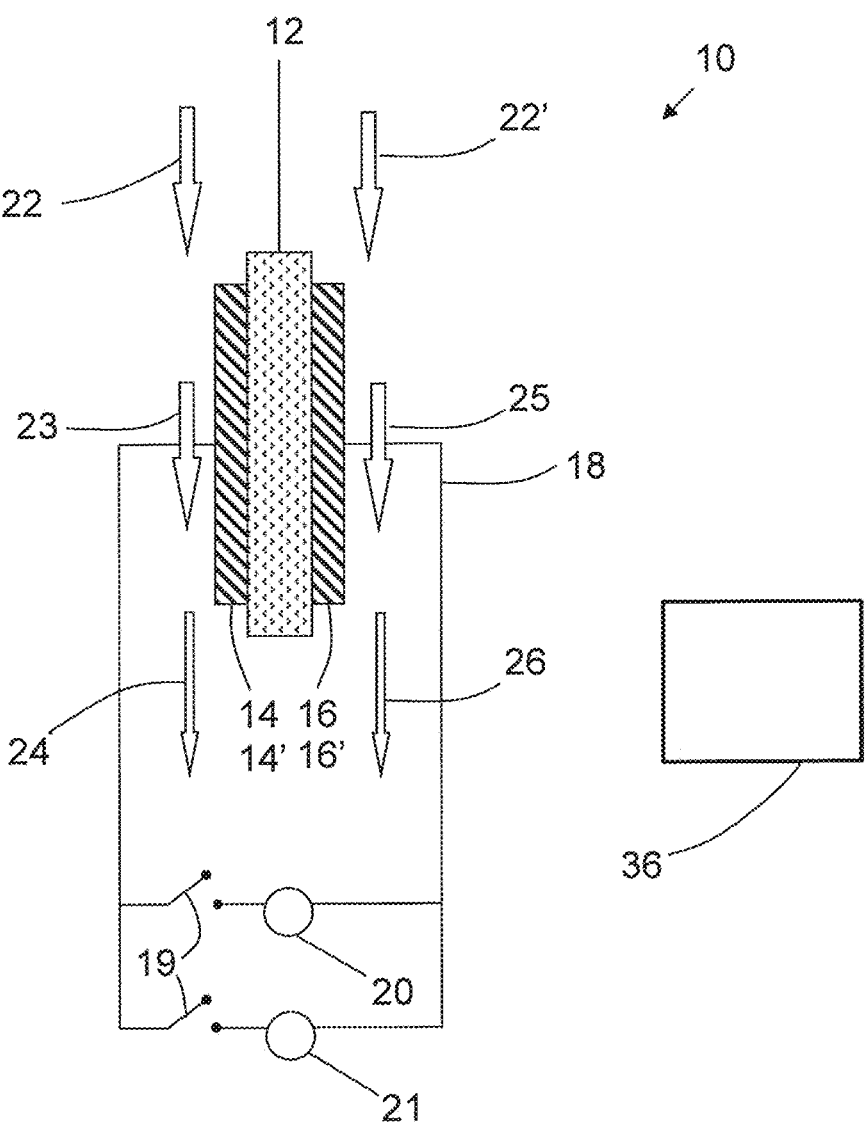
FIG. 2 is a schematic depiction an example embodiment of an electrochemical cell.

Referring now to FIG. 2, an electrochemical cell is schematically depicted. The electrochemical cell 10 comprises a separator 12 that includes an ion transfer medium. As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink 21. In some embodiments, the electric power system 20 can optionally include a connection to the electric power sink 21 (e.g., one or more electricity-consuming systems or components onboard the vehicle) with appropriate switching (e.g., switches 19), power conditioning, or power bus(es) for such on-board electricity-consuming systems or components, for optional operation in an alternative fuel cell mode.

With continued reference to FIG. 2, a cathode supply fluid flow path 22 directs gas from an air source (not shown) into contact with the cathode 14. Oxygen is electrochemically depleted from air along the cathode fluid flow path 23, and can be exhausted to the atmosphere or discharged as nitrogen-enriched air (NEA) (i.e., oxygen-depleted air, ODA) to an inerting gas flow path 24 for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 includes water when the electrochemical cell is operated in an electrolyzer mode to produce protons at the anode for proton transfer across the separator 12 (e.g., a proton transfer medium such as a proton exchange membrane (PEM) electrolyte or phosphoric acid electrolyte). Water can also be recycled from an anode exhaust 26, and water generated at the cathode 14 can also cross the separator 12 to the anode 16.

The system is also configured for alternative operation in a fuel cell mode in which the anode fluid flow path 25 can be configured to controllably alternatively receive fuel (e.g., methanol, formaldehyde, ethanol). During fuel cell operation, protons formed at the anode are transported across the separator 12 to the cathode 14, leaving predominantly carbon dioxide on the anode fluid flow path, which is exhausted through an anode exhaust 26. Control of fluid flow along these flow paths can be provided through conduits and valves (not shown), which can be controlled by a controller 36 including a programmable or programmed microprocessor. The controller 36 can be in operative communications with valves, pumps, compressors, or other fluid flow components and with switches and other electrical system components to selectively operate the electrochemical cell in either the first or second modes. These control connections can be through wired electrical signal connections (not shown) or through wireless connections. The controller 36 can include a microprocessor that is programmed with instructions for sending signals to carry out control of any of the operations described herein.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is the family of commercially-available NAFION™ resins. Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell in the air separation mode, water at the anode undergoes an electrolysis reaction according to the formulae:

$$H_2O \rightarrow \tfrac{1}{2}O_2 + 2H^+ + 2e^- \tag{1}$$

Electricity for the electrolysis reaction is drawn from electrical circuit 18 powered by electric power source 20 connecting the positively charged anode 16 with the cathode 14. The hydrogen ions (i.e., protons) produced by this reaction transport across the separator 12, where they react at the cathode 14 with oxygen in the cathode flow path 23 to produce water according to the formula $$\tfrac{1}{2}O_2 + 2H^+ + 2e^- \rightarrow H_2O \tag{2}$$

Removal of oxygen from cathode flow path 23 produces nitrogen-enriched air exiting the region of the cathode 14.

The oxygen evolved at the anode 16 by the reaction of formula (1) is discharged as anode exhaust 26, which can be used for oxygen-consuming on-board components such as cabin breathing air as described in greater detail below.

During operation of a proton transfer electrochemical cell in a fuel cell mode, fuel (e.g., methanol, formaldehyde, ethanol) at the anode undergoes an electrochemical oxidation according to the formulae below for different fuels:

$$CH_3OH + H_2O \rightarrow 6H^+ + 6e^- + CO_2 \tag{3a}$$

$$CH_2O + H_2O \rightarrow 4H^+ + 4e^- + CO_2 \tag{3b}$$

$$C_2H_5OH + 3H_2O \rightarrow 12H^+ + 12e^- + 2CO_2 \tag{3c}$$

Side reactions involving formation of carbon monoxide and its subsequent oxidation to carbon dioxide by reaction with hydroxyl radicals derived from electrolyzed water molecules also occur, but are not shown here. The electrons produced by these reactions flow through electrical circuit 18 to provide electric power to the electric power sink 21. The hydrogen ions (i.e., protons) produced by these reactions migrate across the separator 12, where they react at the cathode 14 with oxygen in the cathode flow path 23 to produce water according to the formula (2).

$$\tfrac{1}{2}O_2 + 2H^+ + 2e^- \rightarrow H_2O \tag{2}$$

Removal of oxygen from cathode flow path 23 produces nitrogen-enriched air exiting the region of the cathode 14, allowing for continued generation of inert gas simultaneous generation of electrical power.

In some embodiments, the fuel comprises methanol. In some embodiments, the fuel comprises formaldehyde. In some embodiments, the fuel comprises ethanol. In some embodiments, the fuel can comprise a mixture of any two of these compounds or can comprise all three compounds. The choice of fuel can provide a technical benefit of ease of transport, storage, and handling, compared to hydrogen fuel. Additionally, formaldehyde's low boiling point may facilitate feeding to the electrochemical cell in a gas mode.

As discussed above, the electrolysis reaction occurring at the higher-voltage anode 16 requires water, and the ionic polymers used for a PEM electrolyte perform more effectively in the presence of water. Accordingly, in some embodiments, a PEM membrane electrolyte is saturated with water or water vapor. Although the reactions (1a-b) and (2) are stoichiometrically balanced with respect to water so that there is no net consumption of water, in practice some amount of moisture will be removed through the cathode exhaust 24 and/or the anode exhaust 26 (either entrained or evaporated into the exiting gas streams). Accordingly, in some exemplary embodiments, water from a water source is circulated past the anode 16 along an anode fluid flow path (and optionally also past the cathode 14) and recycled to the anode 16. Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (e.g., through a water circulation loop, not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

Figure 3:
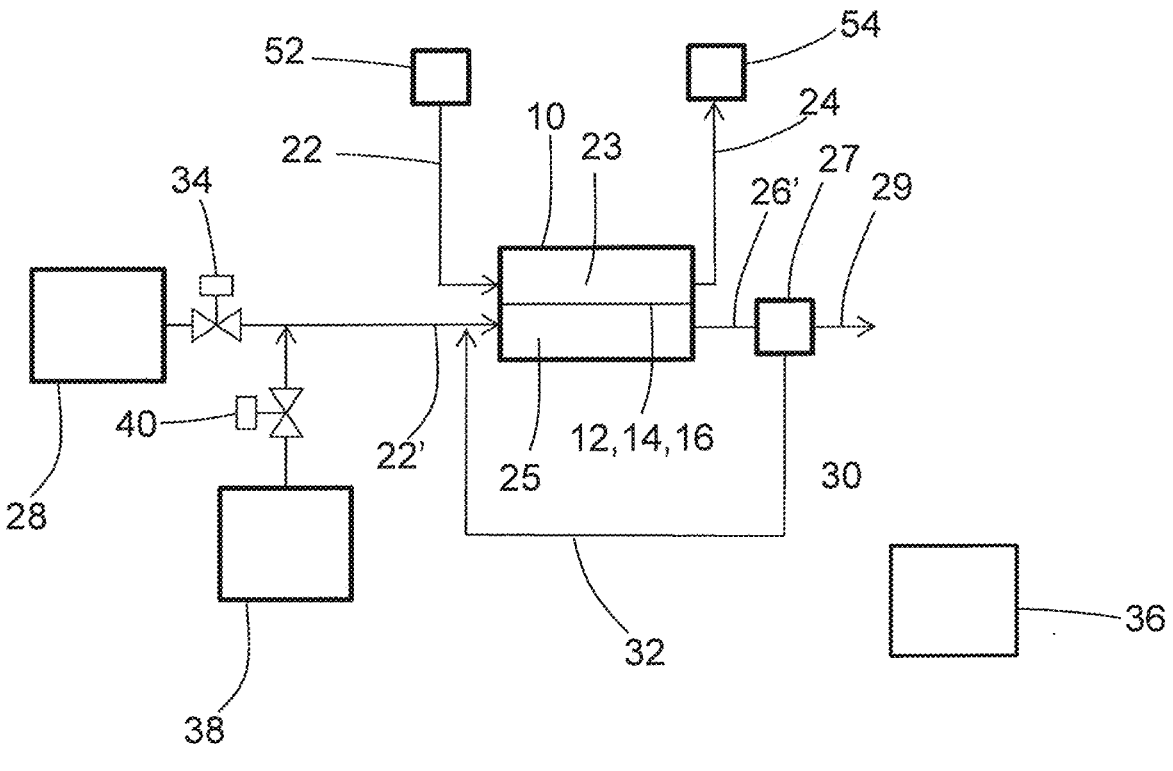
FIG. 3 is a schematic illustration of an example embodiment of an electrochemical inert gas generating system.

An example embodiment of an inerting gas generating system that can be used as an on-board aircraft inerting system with an electrochemical cell 10 is schematically shown in FIG. 3. As shown in FIG. 3, water from a process water source 28 is directed (e.g., by a pump, not shown) through a flow control valve 34 along the anode supply fluid flow path 22' to the anode fluid flow path 25, where can be electrolyzed at the anode 16 to form protons, and oxygen. Fuel from a fuel source 38 is directed (e.g., by a pump, not shown) through a flow control valve 40 along the anode supply fluid flow path 22' to the anode fluid flow path 25, where it can form protons at the anode 16 according to the formulae above. The protons are transported across the separator 12 to the cathode 14, where they combine with oxygen from airflow along the cathode fluid flow path 23 to form water. In electrolysis mode, removal of the protons from the anode fluid flow path 25 leaves oxygen gas on the anode fluid flow path, which is discharged as anode exhaust 26 to a fluid flow path 26'. In fuel cell mode, removal of the protons from the anode fluid flow path 25 leaves carbon dioxide gas on the anode fluid flow path, which is discharged as anode exhaust 26 to a fluid flow path 26'. As further shown in FIG. 3, the fluid flow path 26' includes a gas-liquid separator 27 and a flow control valve 30. Although water is consumed at the anode by electrolysis, the fluid exiting as anode exhaust 26 can include gaseous oxygen (or $CO_2$) and water vapor, which is separated as a gas stream 29 that can be exhausted to atmosphere or can be used for other applications such as an oxygen stream directed to aircraft occupant areas, occupant breathing devices, an oxygen storage tank, or an emergency aircraft oxygen breathing system. The gas-liquid separator 27 can include a tank with a liquid space and a vapor space inside, allowing for liquid water to be removed from the liquid space and transported back to the electrochemical cell 10 through anode return conduit 32. Additional gas-liquid separators can be used such as a coalescing filter, vortex gas-liquid separator, or membrane separator.

As further shown in FIG. 3, the electrochemical cell or cell stack 10 generates an inerting gas on the cathode fluid flow path 23 by producing oxygen-depleted air (ODA, also known as nitrogen-enriched air (NEA) at the cathode 14 that can be directed to a protected space 54 (e.g., a fuel tank ullage space, a cargo hold, or an equipment bay). As shown in FIG. 3, an air source 52 (e.g., ram air, compressor bleed, blower) is directed to the cathode fluid flow path 23 where oxygen is depleted by reaction with protons that have crossed the separator 12 to form water at the cathode 14. The ODA thereby produced can be directed to a protected space 54 such as an ullage space in in the aircraft fuel tanks as disclosed or other protected space 54. The inerting gas flow path (cathode exhaust 24) can include additional components (not shown) such as flow control valve(s), a pressure regulator or other pressure control device, and water removal device(s) such as a heat exchanger condenser, a membrane drier, or other water removal device(s). Additional information regarding the electrochemical production of ODA can be found in U.S. Pat. No. 9,941,526, US Patent Application Publication No. 2017/0131131A1, and U.S. patent application Ser. No. 16/023,024, the disclosures of each of which are incorporated herein by reference in their entirety.

As mentioned above, the electrochemical cell can be used to in an alternate mode to provide electric power for onboard power-consuming systems, as disclosed in the aforementioned US Patent Application Publication No. 2017/0131131A1. In this mode, fuel (e.g., methanol, formaldehyde[ethanol) is directed from the fuel source 38 to the anode 16 where protons are formed and are transported across the separator 12 to combine with oxygen at the cathode, thereby producing electricity (and ODA at the cathode 14). Embodiments in which these alternate modes of operation can be utilized include, for example, operating the system in a first mode of water electrolysis (either continuously or at intervals) under normal aircraft operating conditions (e.g., in which an engine-mounted generator provides electrical power) and operating the system in a second mode of electrochemical electricity production in response to a demand for emergency electrical power (e.g., failure of an engine-mounted generator). ODA can be produced at the cathode 14 in each of these alternate modes of operation.

The control of water and fuel flow to the anode fluid flow supply path 22' can be controlled by the control valves 34 and 40. In some embodiments, the fuel can be provided as a solution of methanol, formaldehyde, or ethanol in water at a concentration in the range of 1M to 7M. The fuel in the fuel source 38 (e.g., fuel storage tank) can be stored pre-mixed with water at a desired concentration for feeding directly to the anode fluid flow path 25, or can be stored in a concentrated or pure form in the fuel source 38 and metered by the flow control valve 40 along with water metered by the flow control valve 34 for delivery to the anode fluid flow path 25 at a desired ratio of fuel and water. The presence of water in the anode fluid flow supply path 22' in both electrolyzer and fuel cell modes can provide a technical benefit of promoting easy conversion between the electrolyzer and fuel cell modes. For example, the system can be operated in electrolyzer mode during normal flight conditions with water fed to the anode fluid flow supply path 22', and fuel can be readily introduced to the anode fluid flow supply 22' along with the water flow for conversion to fuel cell mode.

The inerting gas generation system such as shown in FIGS. 2 and 3 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to the controller 36, which can be an independent controller dedicated to controlling the inert gas generating system or the electrochemical cell, or can interact with other onboard system controllers or with a master controller. In some embodiments, data provided by the controller of the inert gas management system can come directly from a master controller.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of producing inert gas and generating electrical power on an aircraft with an electrochemical cell comprising an anode and a cathode separated by a separator comprising a proton transfer medium, the method comprising:

operating the electrochemical cell on the aircraft in a first mode comprising electrolyzing water at the anode to form protons and oxygen, transporting the protons across the separator to the cathode, reacting the protons with oxygen at the cathode, and discharging an inerting gas depleted of oxygen from the cathode;

directing the inerting gas via an inerting gas flow path connected between an output of the cathode and a fuel tank ullage space of the aircraft to the fuel tank ullage space; and operating the electrochemical cell on the aircraft in a second mode, wherein the second mode includes:

producing protons and electrons at the anode from a fuel comprising methanol or formaldehyde, transporting the protons across the separator to the cathode, and transporting electrons to the cathode through an electrical circuit to produce electrical power.

2. The method of claim 1, further comprising discharging an inerting gas depleted of oxygen from the cathode in the second mode of operation.

3. The method of claim 1, wherein the fuel comprises methanol.

4. The method of claim 1, wherein the fuel comprises formaldehyde.

5. The method of claim 1, further comprising directing water to the anode in the second mode of operation.

6. The method of claim 1, comprising operating the cell on-board an aircraft, and operating the system in the first mode continuously or at intervals under normal aircraft operating conditions, and operating the cell in the second mode in response to a demand for emergency electrical power.

7. The method of claim 1, further comprising recycling liquid discharged from the anode back to the anode.

8. The method of claim 1, further comprising operating the system on-board an aircraft and directing oxygen discharged from the anode to a pressurized area of the aircraft or to an occupant breathing system.

* * * * *